Jan. 5, 1937.  C. R. SIMMONS  2,066,861
UPHOLSTERY SPRING
Filed April 12, 1935
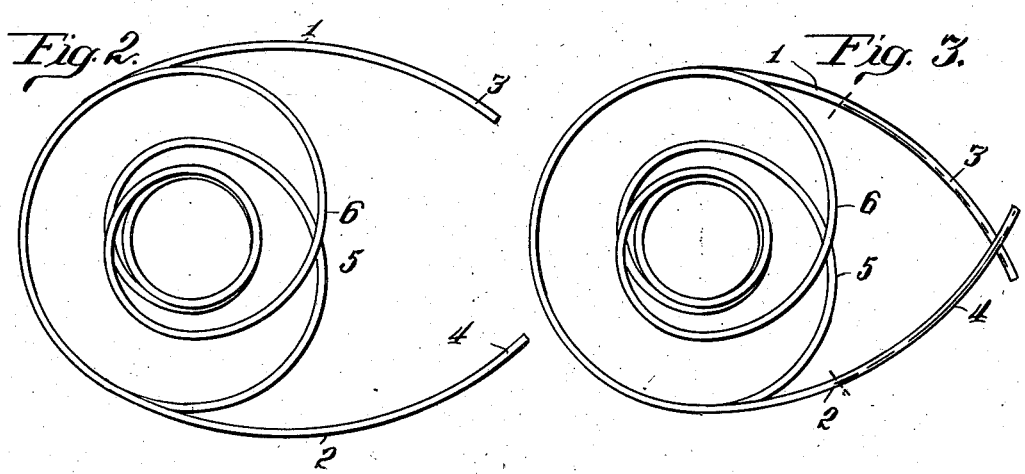
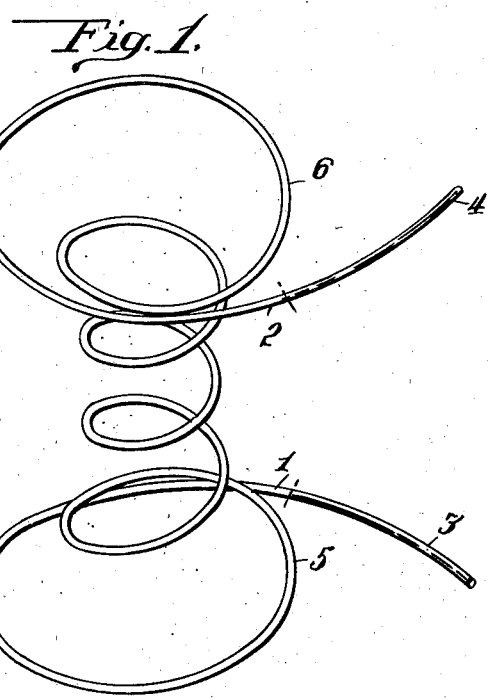
Inventor
Charles R. Simmons Patented Jan. 5, 1937

2,066,861

UNITED STATES PATENT OFFICE 2,066,861

UPHOLSTERY SPRING

Charles R. Simmons, Chicago, Ill., assignor to Nachman Spring-Filled Corporation, Chicago, Ill., a corporation of Illinois Application April 12, 1935, Serial No. 16,019

2 Claims. (Cl. 5—256)

In the upholstery art the employment of springs as a substitute for padding has grown to a very large extent and has led to the manufacture in large quantities of spring assemblies wherein tied or knotted springs are employed and wherein the termini of each spring are coiled about terminal coils of adjacent springs or about stakes and other skeleton wire structures which maintain the springs of the assembly spaced from each other.

Resort has also been had to tempered springs in recent years for the reason that untempered springs change their shape under the influence of load and in a short time produce a distorted spring assembly which is low in the area or areas subject to greatest load conditions. The wire mills have sought to produce wire for the manufacture of springs which is of sufficient carbon content to bear the loads intended for them without suffering appreciable "setting", but springs made of wire of sufficient carbon content or temper to resist successfully the said setting are not adapted for tying or knotting because of the large percentage of breakage that results from the knotting operation.

It has also been attempted to form the springs of annealed steel wire, knot them and then temper the knotted springs, and also to make up complete spring assemblies of such springs and then to temper the entire structure, but these attempts have failed invariably because the tempering causes a very appreciable change in shape of the springs and consequent distortion of knotted springs and spring assemblies sought to be tempered after manufacture thereof.

Accordingly, the present day common practice in the upholstery field is to employ a low carbon pre-tempered steel wire for the manufacture of knotted upholstery springs and for the manufacture of the types of spring assemblies wherein the termini of the component springs are coiled about parts of adjacent springs or about stakes, etc. These springs, while fairly satisfactory from the standpoint of recovery upon relief from load, cause an unduly large loss by breakage in the knotting operation and consequent waste of the broken springs and occasions heavy loss of labor cost in that it happens very frequently that the break occurs after a coil has been so far completed about the adjacent spring or wire included in the assembly that the short piece or ring of wire remaining must be removed. Obviously, such a ring is difficult of engagement by a cutting tool and demands the exercise of appreciable force to effect cutting thereof. As the knotting of springs and the manufacture of spring assemblies is done to a very large extent by women on piece work basis, they suffer loss of pay time while the manufacturer suffers loss of material.

The low carbon pre-tempered type of wire delivered from the mills is not uniform in quality and when too highly tempered, occasions excessive breakages and loss and when too soft, causes springs and spring assemblies to be rejected by purchasers because it sets beyond the limits fixed under the influence of certain loads.

The upholstery industry, therefore, has long sought a solution of a very difficult problem respecting upholstery springs, viz: the production of springs of ample temper to recover completely from compression and which, at the same time, will be capable of being knotted without occasioning appreciable breakages and waste in that operation.

The object of the present invention, therefore, is to provide springs which cost no more than those heretofore and at present commonly used in the upholstery art and which present all of the characteristics desired and required for adaptation to carry load without setting and for knotting or other distortion of their terminal end portions without occasioning the breakage and waste referred to hereinabove.

In the accompanying drawing illustrating a suitable embodiment of the invention:

Fig. 1 is a perspective view of a spring embodying the invention.

Fig. 2 is a plan view of the same before tempering.

Fig. 3 is a plan view of same in its finished or tempered condition.

The spring shown is of the hour-glass type for the reason that springs of this type are generally used most commonly in the upholstery art for the manufacture of spring assemblies of the so-called "all wire" or "all metal" type and also are more commonly tied or knotted than other springs for use individually as, for example in connection with webbing for their support in seating furniture bottoms.

The invention consists in tempering the spring from substantially a point (1) in the lower terminal end portion of the spring to substantially a point (2) in the upper terminal end portion thereof and through the coils of the spring, thus leaving end portions (3) and (4), respectively, in substantially annealed condition and adapting them for bending, as, for example, to coil said end portions (3) and (4), respectively, about the portions (5) and (6), respectively, of the adjacent spring for producing tied or knotted springs.

The springs may be composed of a wire of relatively high carbon content so that, when tempered between the points above indicated, said springs will be self-restoring to their normal length upon being relieved of load effecting compression thereof.

While I have illustrated the invention in a spring of the hour-glass type, it will be understood, of course, that the invention is not limited to any particular type or design of spring but may be embodied in springs of all types employed for any and all purposes for which they are adapted and intended.

The method employed for producing springs of the type described and claimed herein is fully described in my copending application for patent, Serial No. 16,018 and a machine for carrying out the said method is described and claimed in my copending application for patent Serial No. 20,432.

I claim as my invention:—

1. As a new article of manufacture, an upholstery spring consisting of a single piece of wire presenting annealed, bendable terminal end portions and a hardened body portion.

2. As a new article of manufacture, a coiled spring consisting of a single piece of wire presenting readily bendable unhardened terminal end portions adapted to be shaped easily into permanent formations adapted for connecting the spring with other devices, and a body portion possessing appreciably greater resilience and greater self-restoring characteristics than the said terminal portions.

CHARLES R. SIMMONS.